(12) United States Patent
Dupont et al.

(10) Patent No.: US 8,296,914 B2
(45) Date of Patent: Oct. 30, 2012

(54) DEVICE FOR CONNECTING THE END OF A FLEXIBLE LIQUID SUPPLY PIPE TO A FIXED TUBING SUCH AS THE MANIFOLD ON A SHIP

(75) Inventors: Bernard Dupont, Eaubonne (FR); Luc Boulat, Grenoble (FR); Remi Forget, Neauphlete-Breval (FR)

(73) Assignee: Societe Europeenne d'Ingenierie Mecanique—EURODIM, Rueil Malmaison Cedex (FR)

( * ) Notice: Subject to any disclaimer, the term of this patent is extended or adjusted under 35 U.S.C. 154(b) by 734 days.

(21) Appl. No.: 12/373,071

(22) PCT Filed: Jul. 12, 2007

(86) PCT No.: PCT/FR2007/051657
§ 371 (c)(1),
(2), (4) Date: Feb. 24, 2009

(87) PCT Pub. No.: WO2008/007034
PCT Pub. Date: Jan. 17, 2008

(65) Prior Publication Data
US 2009/0295150 A1    Dec. 3, 2009

(30) Foreign Application Priority Data
Jul. 13, 2006   (FR) ..................................... 06 52986

(51) Int. Cl.
```
B23P 11/00      (2006.01)
B65B 37/00      (2006.01)
B65B 1/04       (2006.01)
B65B 3/00       (2006.01)
B67C 3/00       (2006.01)
B63B 27/00      (2006.01)
B63B 35/00      (2006.01)
B65G 67/00      (2006.01)
F16L 21/00      (2006.01)
```
(52) U.S. Cl. ...................... 29/243.55; 141/231; 141/387; 414/139.4; 414/137.9; 414/138.2
(58) Field of Classification Search ............... 29/243.55; 405/169, 170; 141/231, 387, 388, 279; 414/139.4, 414/139.7, 138.2, 139.6, 141.6
See application file for complete search history.

(56) References Cited

U.S. PATENT DOCUMENTS
2,914,080 A * 11/1959 Silveston ................... 137/236.1
(Continued)

FOREIGN PATENT DOCUMENTS
FR    1569861    6/1969
(Continued)

Primary Examiner — Lee D Wilson
Assistant Examiner — Alvin Grant
(74) Attorney, Agent, or Firm — Leydig, Voit & Mayer, Ltd.

(57) ABSTRACT

A system for connecting a connector end fitting of a mobile flexible liquid supply pipe, for liquified natural gas, for example, to a fixed tubing located on a support with a different system, such as the manifold of a liquid transporter ship. The system comprises a guide device for guiding the fitting in the fixed tubing, for establishment of a connection, and including a cone mounted on the pipe for engagement with a trumpet on the fixed tubing during connection, with a tractive effort applied by a cable fixed to the cone. The guide device is fixed to the fitting on the flexible pipe and is coaxial to the flexible pipe. The invention is applicable to the connection of a hose to the manifold of a ship.

20 Claims, 4 Drawing Sheets

U.S. PATENT DOCUMENTS

| | | | | |
|---|---|---|---|---|
| 2,922,446 A * | 1/1960 | Sheiry | | 141/388 |
| 3,710,859 A * | 1/1973 | Hanes et al. | | 166/339 |
| 4,121,616 A | 10/1978 | Lochte et al. | | |
| 4,206,782 A | 6/1980 | Tuson | | |
| 4,393,906 A | 7/1983 | Gill | | |
| 4,568,221 A * | 2/1986 | Lerique | | 405/169 |
| 4,620,818 A * | 11/1986 | Langner | | 405/169 |
| 4,797,029 A * | 1/1989 | Cowan et al. | | 405/170 |
| 4,848,949 A * | 7/1989 | Castel | | 403/12 |
| 5,067,429 A * | 11/1991 | Castel | | 114/230.26 |
| 6,637,479 B1 * | 10/2003 | Eide et al. | | 141/387 |
| 6,877,527 B2 | 4/2005 | Dupont et al. | | |
| 6,886,611 B2 | 5/2005 | Dupont et al. | | |
| 6,997,083 B1 * | 2/2006 | Olszewski | | 81/57.39 |
| 7,147,021 B2 | 12/2006 | Dupont et al. | | |
| 7,299,835 B2 | 11/2007 | Dupont et al. | | |
| 7,338,091 B2 | 3/2008 | Ghilardi | | |
| 7,543,613 B2 * | 6/2009 | Adkins et al. | | 141/231 |
| 7,954,512 B2 * | 6/2011 | Le Devehat | | 137/615 |

FOREIGN PATENT DOCUMENTS

FR          2824528          11/2002

* cited by examiner

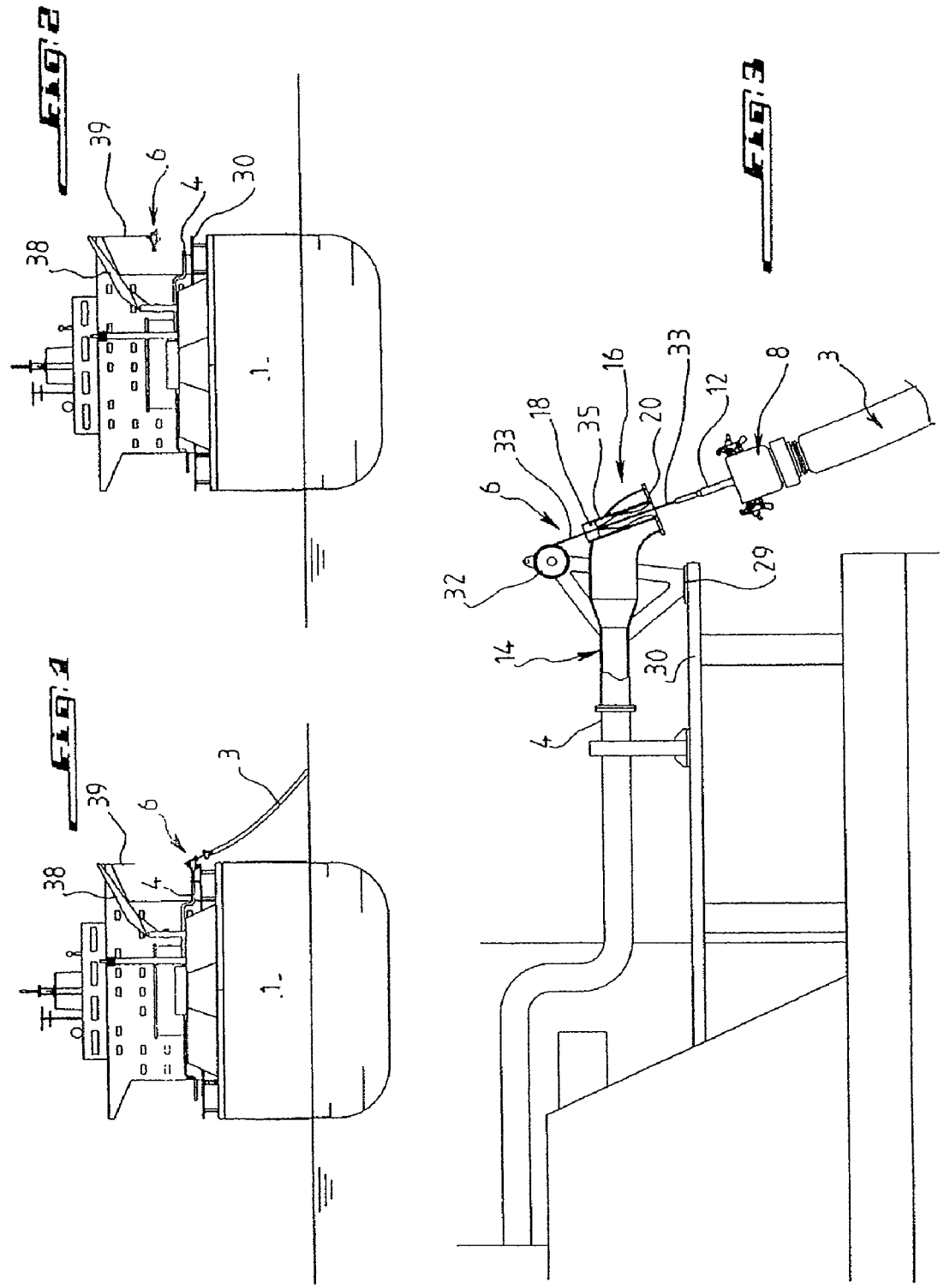

DEVICE FOR CONNECTING THE END OF A FLEXIBLE LIQUID SUPPLY PIPE TO A FIXED TUBING SUCH AS THE MANIFOLD ON A SHIP

FIELD OF THE INVENTION

The invention concerns a device for connecting the end of a deformable pipe for conveying a fluid, such as a cargo hose or an articulated piping for transferring liquefied natural gas, to a fixed piping, such as the manifold of a ship for transporting the fluid, of the type comprising a device for guiding the end of the pipe towards the fixed piping during the establishment of a connection, as well as a cone mounted on the movable pipe or the fixed piping and that is meant to engage a trumpet mounted on the fixed piping or on the movable pipe during connection through the effect of the pulling force exerted on a cable attached to the cone and passing through the trumpet.

BACKGROUND

In known connection systems of this type, the cone and the trumpet are respectively arranged at a certain distance of the pipe and the piping while being oriented approximately parallel to their axes. As a result of this arrangement, the pipe may be subject to rotations or bending and/or torsional stresses when its end fitting is seized during the formation of a connection.

SUMMARY OF THE INVENTION

The purpose of the invention is to offer a connection system that eliminates this drawback.

In order to realize this purpose, the connection system according to the invention is characterized in that the guide device mounted on the connecting end fitting of the deformable pipe is arranged coaxially thereto.

According to one feature of the invention, the system is characterized in that the cone is coaxially mounted in the outlet port of the end fitting or of the outlet end of the fixed piping, projecting axially from it, and in that the trumpet is coaxially mounted in the outlet end of the fixed piping or of the end fitting.

According to another characteristic of the invention, the system is characterized in that the trumpet is made in the form of a tubular piece, and in that the end part of the fixed piping or of the end fitting which contains the trumpet is configured in such a way that the trumpet is able to open outwardly into the outer wall of the tubing or of the end fitting.

According to another characteristic of the invention, the system is characterized in that the connecting end part that is equipped with the trumpet carries a winch for winding a cable that transports the end fitting towards the fixed piping.

According to another characteristic of the invention, the system is characterized in that the fixed piping is the tube of a connecting device, which can be displaced between a rest position and a position for fluid transfer, wherein this tube is interposed between the ship's manifold and the end fitting of the flexible pipe.

According to another characteristic of the invention, the system is characterized in that the deformable pipe is formed by a cargo hose.

According to another characteristic of the invention, the system is characterized in that the deformable pipe is made up of a succession of articulated segments.

According to another characteristic of the invention, the system is characterized in that the end part of the deformable pipe features a succession of three segments which are connected to each other by three rotating joints whose axes are orthogonal to each other.

According to another characteristic of the invention, the system is characterized in that the segments are curved so that the end connected to the end fitting is coaxial thereto and the free end of the segment which is attached to the rest of the pipe is also coaxial to the end fitting.

BRIEF DESCRIPTION OF DRAWING FIGURES

The invention will be better understood, and its other objectives, characteristics, details and advantages will appear more clearly in the explanatory description that follows and that is given with reference to the appended schematic drawings provided only as an example illustrating several embodiments of the invention, wherein FIG. 1 is a view perpendicular to the axis of a transport ship equipped with a connection system according to the invention, illustrated in the state of connection of the deformable transfer pipe to the ship's manifold;

FIG. 2 is a view similar to FIG. 1 but without connection of the pipe to the manifold;

FIG. 3 is an enlarged view of part III of FIG. 1;

DETAILED DESCRIPTION

FIG. 1 shows, in 1, a transport ship for a fluid, for example, a liquefied natural gas, and, in 2, a system for connecting a deformable pipe 3 to manifold 4 of the ship, which, in the example represented, is a cargo hose. In general, the ship constitutes a reference system that is independent of the pipe and that moves in a different way than the pipe.

Figure 4:
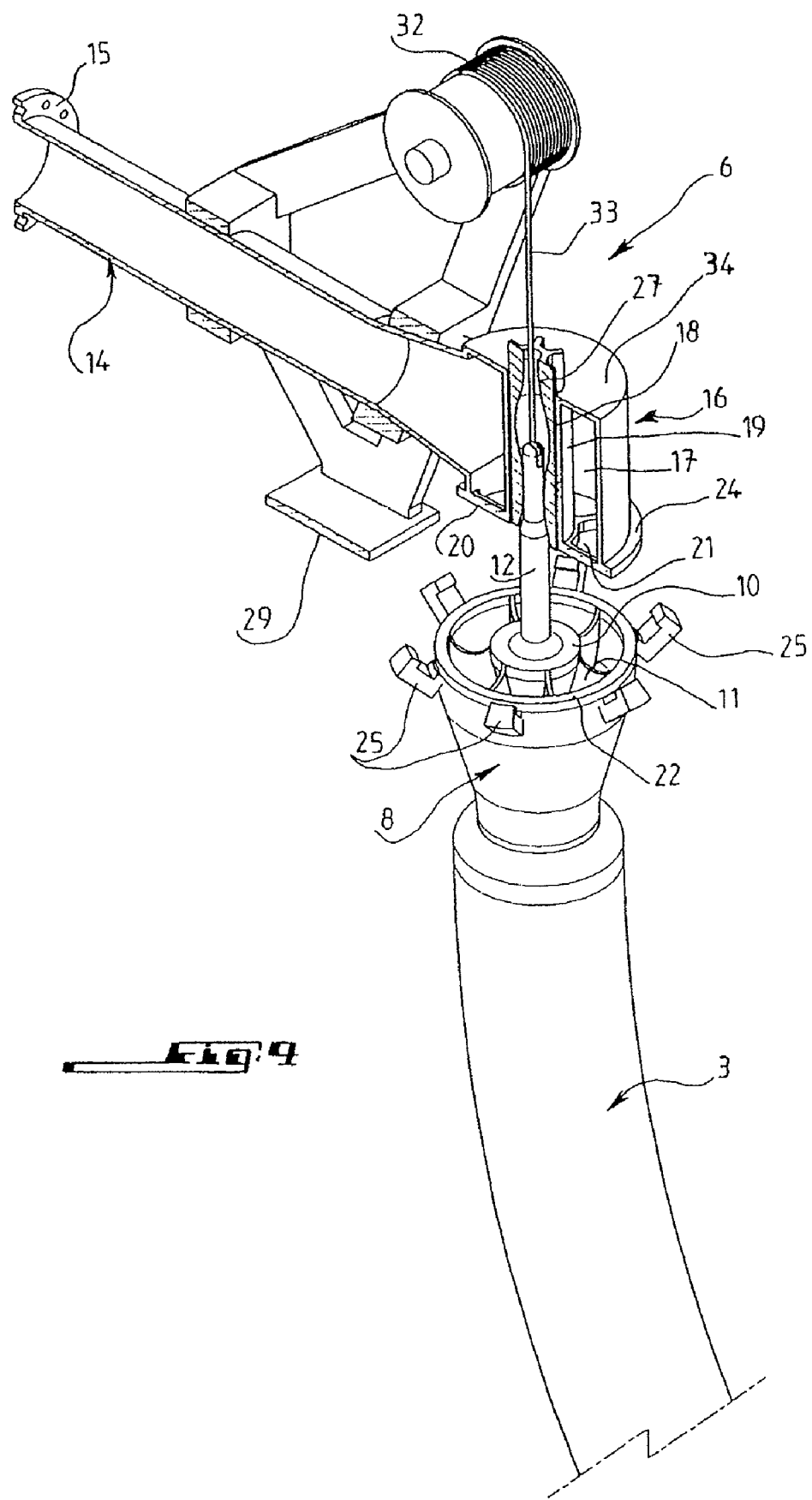
FIG. 4 is an enlarged perspective view partially in section of a connection system similar to the one in FIG. 3, at a later stage of the connecting process.

In this embodiment of the invention, the connection system comprises a connecting device 6 that can be moved between a storage position shown in FIG. 2 and a connecting position in which it is interposed between manifold 4 and connector end fitting 8 of pipe 3. FIGS. 1, 3, and 4 show the device in the connecting position.

As can be very clearly seen in FIG. 4, connector end fitting 8 of cargo hose 3 comprises an element such as a coaxial core 10 secured by radial retention walls 11 of the outlet port. The device carries a guiding cone 12 which extends into and parallel with the axis of end fitting 8 and of cargo hose 3. The cone is thus coaxial with the cargo hose, outside of the end fitting while protruding axially from it in the direction of connection device 6.

This device 6 is equipped with a tube 14, one end of which is fitted with mounting flange 15 for connecting to manifold 4, whereas the other end, intended for connection to end fitting 8, is made in the form of a cylindrical tubular body 16. This body 16 delimits an annular space 17 between its outer cylindrical wall 18 and a hollow center part 19. Annular space 17 communicates with tube 14 and is open in the direction of end fitting 8.

The terminating hollow body 16 comprises a wall 20 facing end fitting 8 that is perpendicular to the axis of the cylindrical body and also to the axis of cone 12. This wall 20 contains drilled holes 21 through which end fitting 8 and tube 14 connect, wall 20 being then applied to annular front face 22 of the end fitting. Wall 20 extends radially beyond the outer wall of hollow body 16 and forms annular flange 24. The end fitting comprises, uniformly distributed around its open end, a number of locking elements 25, in the form of clamps or latches or the like, which are configured to rotate between a holding position of hollow body 16 of tube 14 against annular front face 22 of end fitting 8, that is, in the connecting position of pipe 3 onto tube 14, and a disengaged position shown in FIG. 4.

Inner cylindrical wall 18 of terminating hollow body 16 of connection device 6 delimits an annular space in which a tubular insert 27 can be coaxially mounted. Tubular wall 17 with its insert 27 constitutes the trumpet for receiving cone 21, as can be clearly seen in FIG. 4. The inner wall can also directly constitute the receiving trumpet.

Connection device 6 is configured for supporting tube 14 and features support 29 by means of which it can rest on deck 30 of ship 1. The device also supports winch 32 placed above tube 14 and body 16 so that a cable 33 which can be wound around it may pass approximately coaxially through the receiving trumpet of cone 12 of end fitting 8 and, after having been attached to the tip of the cone, may pull it into the trumpet as it is being wound around the winch, in the manner illustrated in FIG. 4.

In conformity with FIG. 4, trumpet 18 opens, on the side of winch 32, into wall 34, which is parallel to wall 20 of end body 16. In the case of FIG. 3, the terminating body is curved so that the wall of its outlet port 20 is slanted with respect to the horizontal and so that trumpet 18 may open into the peripheral wall of the terminating body, in 35, in the curved part of the body. It should be noted that the trumpet runs coaxially with the axis of the outlet port and is rectilinear.

Figure 5:
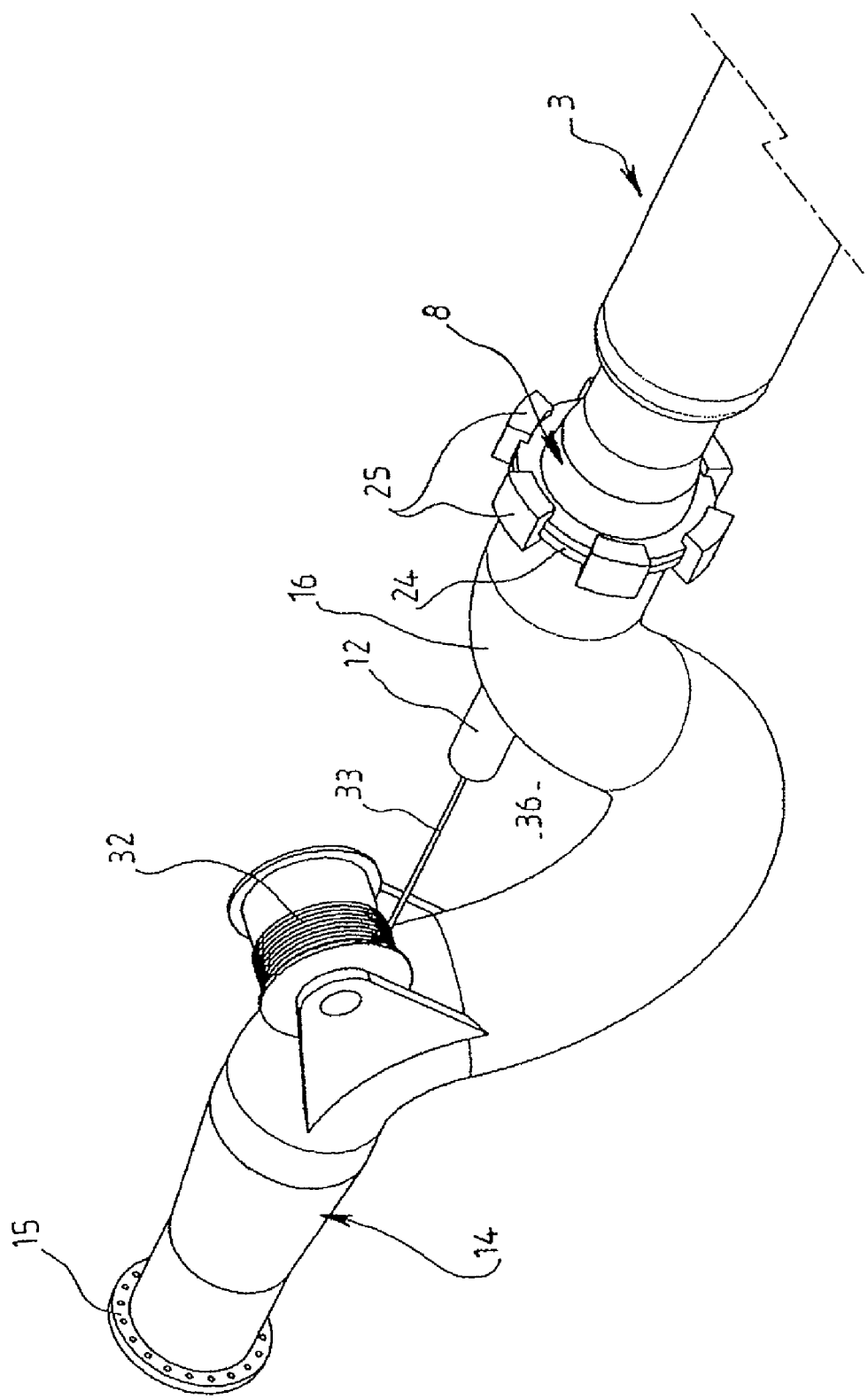
FIG. 5 is a perspective view illustrating another embodiment of a connection system according to the invention.

FIG. 5 shows another embodiment of the connection system. In this case, the fixed piping formed by tube 14 is in the form of an Ω so as to form a space 36 into which the free end of the cone and pulling cable 33 can be inserted, winch 32 being directly mounted on tube 14 at the level of the point of origin of the curvature, facing the end of the cone. As in the case of FIG. 3, one end of piping 10 presents mounting flange 15 for connection to the ship's manifold, whereas the other end is provided with the coaxially mounted internal trumpet. This end can be connected and held in place on end fitting 8 of pipe 3 by means of clamps or latches 25, as can already be seen in FIGS. 3 and 4, which can be of any type, mechanical, hydraulic, or analogs thereof.

In relation to the operation of the connection system, in rest mode, end fitting 8 of pipe 3 can float on the sea surface or be placed on a different moving reference system. When it must be connected to a ship's manifold placed close to the end fitting, the part of the connection system, namely connection device 6, which in rest mode is hanging high above deck 30 of the ship from the end of a supporting arm 38 by means of a cable 39, is first lowered onto deck 30 so that its support 29 may rest on the deck. The connection device could also be stored on the ship and set up by means of an arm. Then cable 33 is paid out from winch 31, passing through the trumpet in order to be attached at its free end to the end of cone 12. Then, by winding the cable on the winch, end fitting 8 is pulled towards the connecting end of tube 14, and in the final stage, is correctly positioned by the cable, the cone and the trumpet, guided to its connecting position on this end of the tube. Due to the coaxial position of the cone in end fitting 8 of deformable pipe 3, the carrying of the end fitting towards its connecting position does not cause any rotary motion and thus no parasitic twisting or bending in the pipe.

It should be noted that the pipe could be a cargo hose or be made up of a succession of rigid articulated segments. On the other hand, the connection device could be permanently mounted on the piping.

Of course, within the framework of the invention, the cone could be mounted in the end of the fixed tube and the trumpet could be mounted in end fitting 8 of deformable pipe 3. The winch would then also be mounted on the end fitting, which could then have a curved shape, in similar fashion to the connecting end of tube 14 in FIG. 3 to ensure the opening towards the outside of the trumpet.

In relation to the connection device, instead of being displaceable as in the example represented, it could be permanently mounted on the deck of the ship. The essential function of this device is to push the connecting face to which the end fitting of the pipe will be connected to the side of the ship or beyond it to ensure the collection of the pipe from below, advantageously according to an appropriate angle with respect to the vertical or even in this direction.

Figure 7:
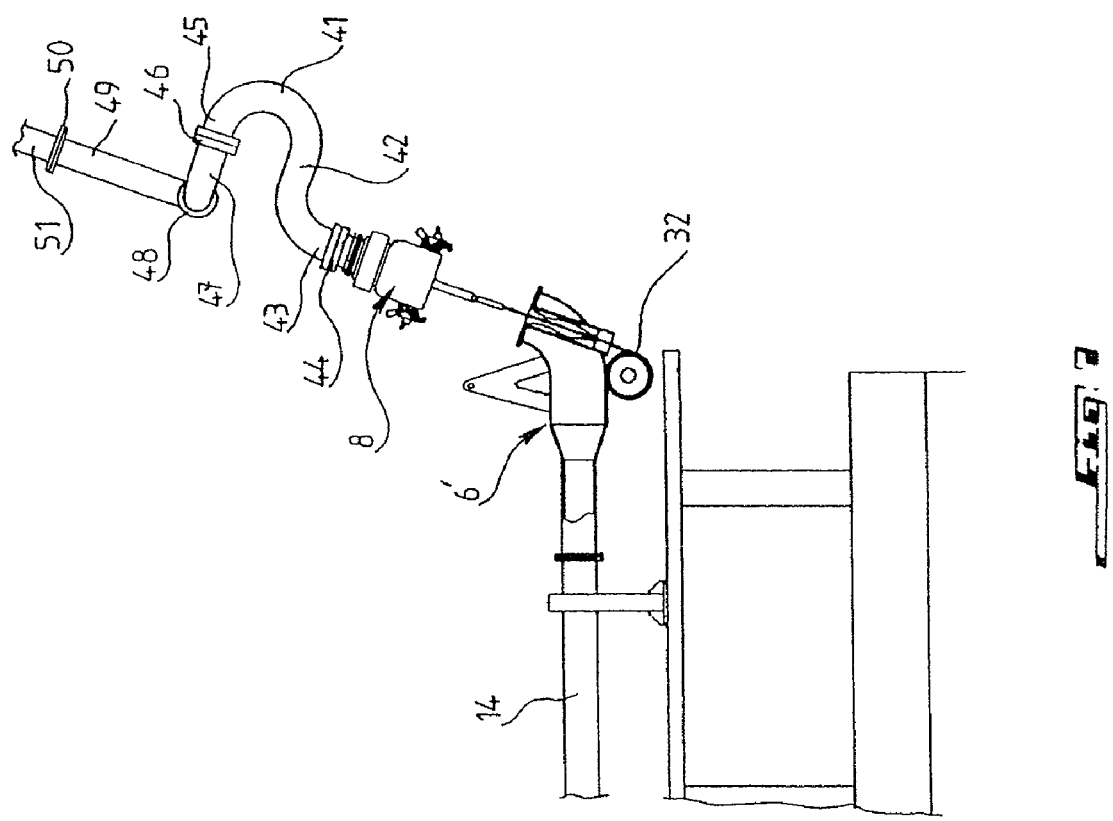
FIGS. 6 and 7 are lateral views of two variants of another embodiment of the invention.
Figure 6:
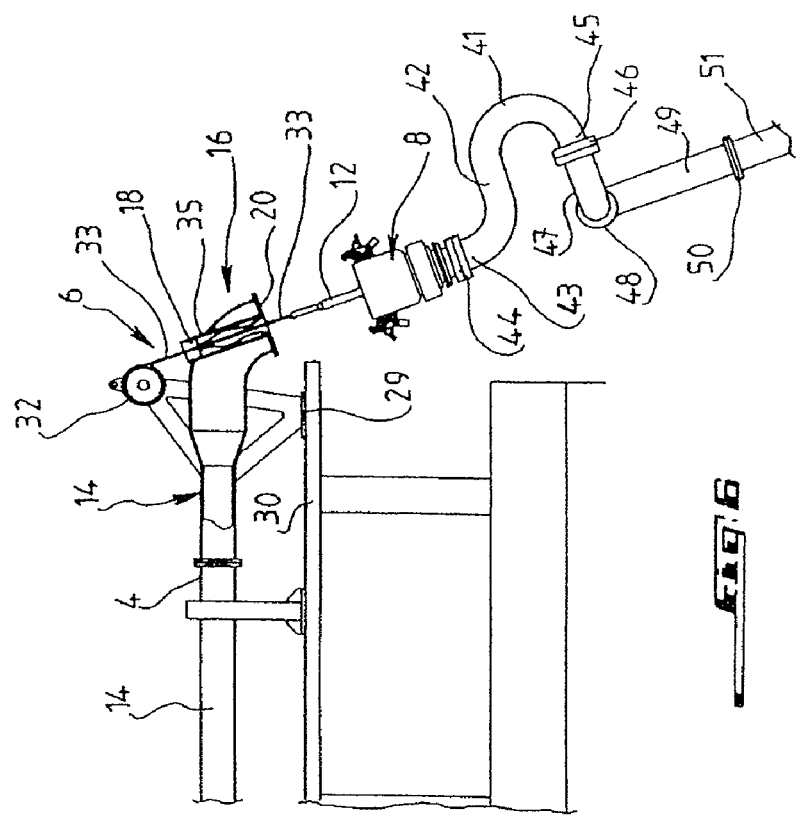

What emerges from the foregoing is that the invention generally concerns the connecting of two pipes, each of them fixed or movable, deformable or rigid, and moving with different uncontrollable motions. The connection operation is ensured simply by means of coaxially pulling the cable, then the cone, through the trumpet, which itself crosses through or opens outside of the fluid confinement, so as to prevent, during the connection process, any parasitic torsional or bending stresses in the case of cargo hoses or parasitic rotary motions in the case of articulated arms equipped with the equivalent of a ball-and-socket joint at their ends. FIGS. 6 and 7 illustrate the connecting end of a pipe which has three successive segments, connected to each other by three rotating joints, each having an axis oriented in one of three orthogonal dimensions. More precisely, the end part comprises a U-shaped segment 41, one branch 42 of which is extended and curved according to a 90° angle, all the while staying in the plane of the U. The free end 43 is connected to the end fitting 8 by means of a rotating joint 44. The free end of the other branch 45 of segment 41 is connected by means of a rotating joint 46 to a second segment 47 curved in the shape of an L, the other end of which is connected by means of a rotating joint 48 to a third pipe segment 49, also curved in the shape of an L, the free end 50 of which is coaxial with end fitting 8 and attached by a flange 51 to arm 52 of the pipe, which is aligned with branch 50 of segment 49. It should be noted that the adjacent and connected branches of the two segments 47 and 49 are aligned with one another and that their other branches delimit a 90° angle. It is due to this configuration of the connecting end of the pipe that each of the axes of the three rotating joints 44, 46, and 48 extend in one of the three orthogonal directions of space.

FIGS. 6 and 7 furthermore illustrate that the end fitting of connection 8 of the movable pipe can be connected to the fixed piping while being oriented obliquely, from below, as in FIG. 3, or from above. In the latter case, connection device 6, now referenced as 6', essentially has the same configuration as in FIG. 3, but opens obliquely upward, winch 32 being then placed below.

The invention claimed is:

1. A system comprising:
a fixed piping located on a support;
a movable deformable pipe for conveying fluid to the fixed piping, wherein
the moveable deformable pipe includes a connector end fitting that detachably connects to the fixed piping, and the support and the movable deformable pipe have different reference systems;

a guiding device for guiding the connector end fitting towards the fixed piping during establishment of a connection of the moveable deformable pipe to the fixed piping;

guiding components including a cone and a trumpet, wherein the cone is mounted on one of the movable deformable pipe and the fixed piping, and the trumpet is mounted on the other of the movable deformable pipe and the fixed piping; and a cable attached to the cone for exerting a pulling force on the cone, wherein one of the guiding components is mounted on the connector end fitting of the movable deformable pipe and is coaxial with the connector end fitting, and the guiding components are located outside of a conveyance path of the fluid being conveyed through the system when the connector end fitting is connected to the fixed piping.

2. The system according to claim 1, wherein
the cone is coaxially mounted in one of an outlet port of the connector end fitting and an outlet end of the fixed piping, projecting axially, and
the trumpet is coaxially mounted in one of the outlet end of the fixed piping and the connector end fitting.

3. The system according to claim 2, wherein
the trumpet is tubular, and
one of the outlet end of the fixed piping and the connector end fitting contains the trumpet so that the trumpet opens outwardly into one of an outer wall of the fixed piping and an outer wall of the connector end fitting.

4. The system according to claim 1, wherein the guiding components include a winch for winding the cable for transporting the connector end fitting towards the fixed piping.

5. The system according to claim 1, wherein the fixed piping includes a tube which can be moved between a rest position and a position for fluid transfer, and the tube is interposed between the fixed piping and the connector end fitting of the movable deformable pipe.

6. The system according to claim 1, wherein the movable deformable pipe is a cargo hose.

7. The system according to claim 1, wherein the movable deformable pipe includes a succession of articulated segments.

8. The system according to claim 1, wherein the movable deformable pipe includes three segments which are connected to each other by three rotating joints having hose axes that are orthogonal to each other.

9. The system according to claim 8, wherein
the segments are curved so that an end connected to the connector end fitting is coaxial with the connector end fitting, and
a free end of one segment, which is attached to the movable deformable pipe, is also coaxial with the connector end fitting.

10. The system according to claim 1, wherein the guiding device is mounted on the fixed piping and is arranged coaxially within the fixed piping.

11. The system according to claim 1, wherein
the cone is coaxially mounted in an outlet port of the connector end fitting and projects axially from the outlet port of the connector end fitting, and the trumpet is coaxially mounted in the outlet end of the fixed piping.

12. The system according to claim 11, wherein the connector end fitting includes a coaxial core that supports the cone.

13. The system according to claim 12, wherein the coaxial core is connected to the connector end fitting by radial retention walls.

14. The system according to claim 1, wherein the connector end fitting includes an outlet port and the outlet port includes locking elements.

15. The system according to claim 14, wherein
the fixed piping includes an outlet end, and
the outlet end includes an annular flange that is engaged by the locking elements when the connector end fitting is connected to the fixed piping.

16. The system according to claim 1, wherein the cone engages the trumpet when the connector end fitting is connected to the fixed piping.

17. A system comprising:
a fixed piping;
a movable deformable pipe for conveying fluid to the fixed piping, wherein the moveable deformable pipe includes a connector end fitting that detachably connects to the fixed piping;

guiding components including a cone and a trumpet, wherein the cone is mounted on one of the movable deformable pipe and the fixed piping, and the trumpet is mounted on the other of the movable deformable pipe and the fixed piping; and a cable attached to the cone and extending substantially through the trumpet, for exerting a pulling force on the cone, wherein one of the guiding components is mounted on the connector end fitting and is coaxial with the connector end fitting, and the guiding components are located outside of a conveyance path of the fluid being conveyed through the system when the connector end fitting is connected to the fixed piping.

18. The system according to claim 17, wherein the cone engages the trumpet when the connector end fitting is connected to the fixed piping.

19. A system comprising:
a fixed piping located on a support;
a movable deformable pipe for conveying fluid to the fixed piping, wherein
the moveable deformable pipe includes a connector end fitting that detachably connects to the fixed piping, and
the support has a different reference system than the moveable deformable pipe;

a guiding device for guiding the connector end fitting towards the fixed piping during establishment of a connection of the movable deformable pipe to the fixed piping;

guiding components including a cone and a trumpet, wherein the cone is mounted on one of the movable deformable pipe and the fixed piping, and the trumpet is mounted on the other of the movable deformable pipe and the fixed piping; and a cable attached to the cone and extending substantially through the trumpet, for exerting a pulling force on the cone, wherein one of the guiding components is mounted on the connector end fitting and is coaxial with the connector end fitting,
another of the guiding components is mounted coaxially with an outlet end of the fixed piping,
the cable is coaxially attached to the cone and extends coaxially through the trumpet,
the guiding components are located outside of a conveyance path of the fluid being conveyed through the system when the connector end fitting is connected to the fixed piping, and
coaxial mounting of the guiding components avoids rotational motion, bending stress, and torsional stress during connection of the connector end fitting to the fixed piping.

20. The system according to claim 19, wherein the cone engages the trumpet when the connector end fitting is connected to the fixed piping.

* * * * *